(12) United States Patent
Belkar

(10) Patent No.: US 11,977,668 B2
(45) Date of Patent: May 7, 2024

(54) DEVICES AND METHODS FOR SUPPORTING INPUT/OUTPUT CHANNEL PROTECTION

(71) Applicant: Huawei Technologies Co., Ltd., Shenzhen (CN)

(72) Inventor: Ben-Shahar Belkar, Hod Hasharon (IL)

(73) Assignee: Huawei Technologies Co., Ltd., Shenzhen (CN)

(*) Notice: Subject to any disclaimer, the term of this patent is extended or adjusted under 35 U.S.C. 154(b) by 366 days.

(21) Appl. No.: 17/348,352

(22) Filed: Jun. 15, 2021

(65) Prior Publication Data
US 2022/0027523 A1    Jan. 27, 2022

Related U.S. Application Data

(63) Continuation of application No. PCT/EP2020/071011, filed on Jul. 24, 2020.

(51) Int. Cl.
| | |
|---|---|
| *G06F 21/85* | (2013.01) |
| *G06F 13/24* | (2006.01) |
| *G06F 16/23* | (2019.01) |
| *G06F 21/56* | (2013.01) |

(52) U.S. Cl.
CPC .............. *G06F 21/85* (2013.01); *G06F 13/24* (2013.01); *G06F 16/2379* (2019.01); *G06F 21/566* (2013.01); *G06F 21/567* (2013.01); *G06F 2221/034* (2013.01)

(58) Field of Classification Search
CPC ...... G06F 21/85; G06F 13/24; G06F 16/2379; G06F 21/566; G06F 21/567; G06F 2221/034; G06F 21/79; G06F 21/606
USPC .............................................. 726/23
See application file for complete search history.

(56) References Cited

U.S. PATENT DOCUMENTS

| | | | |
|---|---|---|---|
| 2019/0042766 A1* | 2/2019 | Pappachan | H04L 9/0819 |
| 2019/0107965 A1 | 4/2019 | Deval et al. | |
| 2019/0268308 A1* | 8/2019 | Sinha | G06F 16/2255 |
| 2019/0384923 A1 | 12/2019 | Leitao et al. | |

OTHER PUBLICATIONS

"InfiniBand™ Architecture Specification vol. 1," Release 1.2.1, total 1727 pages (Nov. 2007).

* cited by examiner

*Primary Examiner* — Jeffrey C Pwu
*Assistant Examiner* — Nega Woldemariam
(74) *Attorney, Agent, or Firm* — Leydig, Voit & Mayer, Ltd.

(57) ABSTRACT

The present disclosure relates to a device for supporting Input/Output (I/O) channel protection. The device maintains one or more channel protection enclaves (CPEs), wherein each CPE is associated with a different I/O channel, wherein each I/O channel is associated with a different address space of a memory, and wherein each CPE is allocated verification information comprising the address space associated with its associated I/O channel. The device further receives a transaction on a given I/O channel, the transaction comprising access information including one or more target addresses. Moreover, the device determines a correlation of the transaction's access information and the verification information of the CPE associated with the given I/O channel, and allows or aborts execution of the transaction, based on whether the determined correlation meets a predefined criterion.

12 Claims, 6 Drawing Sheets

DEVICES AND METHODS FOR SUPPORTING INPUT/OUTPUT CHANNEL PROTECTION

CROSS-REFERENCE TO RELATED APPLICATIONS

This application is a continuation of International Application No. PCT/EP2020/071011, filed on Jul. 24, 2020, the disclosure of which is hereby incorporated by reference in its entirety.

TECHNICAL FIELD

The present disclosure relates generally to the field of data processing, and, more particularly, to supporting Input/Output (I/O) channel protection. To this end, the disclosure presents a device and a method for supporting I/O channel protection. For example, the device and the method may provide a Channel Protection Enclaves (CPE) mechanism, allowing the function to isolate memories assigned to different queues, process, containers, etc.

BACKGROUND

Conventional I/O devices typically communicate with other entities on a host platform using memory-mapped channels. For example, when using conventional I/O device queues (e.g., rings), a technique to point to a buffer for a data write/read is based on using a descriptor (e.g., in Non-Remote Direct Memory Access (Non-RDMA)). Another technique is Non-Volatile Memory express (NVMe) queue (e.g., ring), which uses a similar communication technique as the I/O device; however, in NVMe there is a special command instead of a descriptor, to point to the data read/write buffer.

Moreover, a software (SW) process may post any buffer pointer value on a descriptor or a command of a channel. However, there might be no protection from malicious or erroneous posting. For example, when an I/O device is reading from a channel a descriptor or a command with an associated buffer pointer, there is no limitation accessing it, and the IOMMU (I/O Memory Management Unit) is responsible for validating the access rights.

Conventional devices and methods are based on verifying a Bus Device Function (BDF) identity or a bus function of the I/O device and an address (pre-configured by the host SW). For example, on RDMA devices, there is a method to isolate Queue Pair (QP) memory access using Protection Domain (PD), Memory Region (MR), Shared Memory Region (SMR), Memory Window (MW), etc. Moreover, in order to assist in routing, each Peripheral Component Interconnect express (PCIe) device has a BDF number (e.g., Bus:8 bit Device:5 bit function:3 bit). Further, each device may have 8 functions (3 bit) and each function may be treated as a logical device inside the device. Each function may perform a design specific operation. For example, if a critical computing platform mandates a dedicated network card, with the help of the logical devices (i.e., the functions), 8 different servers may see 8 different network cards, although, physically only one Network Interface Card (NIC) is present. Alternatively, each function might have a different functionality. Furthermore, in order to increase the number of functions that can be supported, Alternative Routing-ID Interpretation (ARI) is suggested for interpreting device and function numbers. In the ARI routing, the function number is 8 bit and a total of 256 functions are feasible, while, on the non ARI routing (e.g., the routing based on the BDF), a 3 bit function field is supported and a total of 8 functions may exist.

Moreover, in the Virtual Functions (VFs), all queues that belong to the same VF may access the whole memory space of that VF. Moreover, if isolation is required, then, different VFs may be created.

Furthermore, in Assignable Device Interface (ADI), using a Process Address Space Identifier (PASID ID), a queue assigned to the ADI may only access the memory that belongs to the same process. Moreover, the same function may have a few ADIs assigned to different processes and full isolation may be preserved.

However, conventional devices and methods have an issue that, for example, QPs of different PDs cannot access other PD MRs. Another issue of conventional devices is QPs of the same PD may access only the MRs allocated or registered on the same PD. Further, on RDMA, QPs may only access MW that is bounded by them (i.e., No QP sharing).

SUMMARY

In view of the above-mentioned problems and disadvantages, embodiments of the present disclosure aim to improve conventional devices and methods for supporting I/O channel protection.

An objective is to provide a new solution for providing channel isolation and protection of memory resources using a distinct identity management scheme. For example, the solution should not rely on the BDF, the PASID, or the IOMMU protection. Moreover, the solution should enhance capabilities and isolation granularity. In particular, a device and method according to embodiments of the disclosure should provide a transparent solution which shall not change the transport protocol or the packets, and the application data path interface should also stays the same.

The objective is achieved by the embodiments of the disclosure as described in the enclosed independent claims. Advantageous implementations of the embodiments of the disclosure are further defined in the dependent claims.

A first aspect of the present disclosure provides a device for supporting I/O channel protection. The device is configured to maintain one or more CPEs, wherein each CPE is associated with a different I/O channel, wherein each I/O channel is associated with a different address space of a memory, and wherein each CPE is allocated verification information comprising the address space associated with its associated I/O channel, receive a transaction on a given I/O channel, the transaction comprising access information including one or more target addresses, determine a correlation of the transaction's access information and the verification information of the CPE associated with the given I/O channel, and allow execution of the transaction, when the determined correlation meets a predefined criterion.

The device may be, or may be incorporated in, an electronic device such as a personal computer, a server computer, a client computer, a laptop and a notebook computer, a tablet device, a mobile phone, a smart phone, etc.

The device may provide (e.g., support) a CPE mechanism. For example, the device may comprise an entity such as a SW, a FW, a HW, etc., which may create the one or more CPEs. Moreover, the device (e.g., the entity of the device) may populate the CPE with the required information, and may further dynamically or statically assign queues to the one or more CPEs.

For example, the device may create the CPEs through an application programming interface (API) to the HW where an application or an infrastructure creates the CPE. Moreover, the policies, a behavioral database (DB), and an identity manager may be given upon the creation of the CPE, or at a later stage, since their information may change during the execution. Furthermore, once a given CPE is created, any queue may be assigned to that CPE.

The verification information may be, for instance, an address space access (for example, only the address space of a process that is configured on a given CPE may be allocated to that CPE). Moreover, the address space access may have different rights (e.g., write, read, etc.), and a queue traffic might only access a CPE with a defined address and with a defined access right given to that address.

In another example, an application does a tail bump or rings a doorbell of a queue that does not belong to that application. Further, the device may check in the CPE, and if it belongs to the CPE, the device may fetch the Tx descriptor. However, if it does not belong to the CPE, the device may ignore the tail bump or doorbell.

Moreover, the device may allow execution of the transaction, when the determined correlation meets the predefined criterion. For example, if an inbound packet arrives and an Rx descriptor points to a read only buffer, then the transaction may fail, the DB may be updated, and the drivers may be notified about the event. Furthermore, the queue may continue working afterwards, or it might stop working.

Furthermore, the device may comprise another entity such as a HW, a FW, a SW, or any system entity which may, for example, whenever the device attempts to perform a memory access or a Direct Memory Access (DMA), and the target addresses for that access (whether it is a read or write access), originated from an untrusted/protected entity, the device may correlate the information in the CPE with said access information.

The device of the first aspect may provide an interchangeable interface role remapping function (i.e., the interfaces may change, the roles of the interfaces may change, remapped, etc.), and may further solve an isolation issue. For example, the device may provide isolation between the I/O channels such as device queues that belong to the same function. Furthermore, the device may enhance security, increase performance, etc. Moreover, the device may also enable isolating different process memory space, when queues associated with different processes, belong to the same function.

The device may comprise a circuitry. The circuitry may comprise hardware and software. The hardware may comprise analog or digital circuitry, or both analog and digital circuitry. In some embodiments, the circuitry comprises one or more processors and a non-volatile memory connected to the one or more processors. The non-volatile memory may carry executable program code which, when executed by the one or more processors, causes the device to perform the operations or methods described herein.

In an implementation form of the first aspect, the device is further configured to abort, when the determined correlation does not meet the predefined criterion, the transaction, and output a notification message, the notification message indicating that the transaction is aborted.

For example, the device may determine the correlation of the transaction's access information and the verification information of the CPE. Moreover, if a match is found, the device may process it, and if no match is found, the device may drop it and may further notify the different entities.

In some embodiments, the device may determine that there is no space for all CPEs on the memory. Moreover, the device may store the CPEs on a host memory chip (HMC), and may further use a caching mechanism to fetch and evict.

In a further implementation form of the first aspect, the device comprising a management plane configured to assign each I/O channel to a determined CPE, wherein a total number of the assigned I/O channels is equal to or smaller than a total number of the CPEs.

In a further implementation form of the first aspect, the management plane is configured to assign each I/O channel to a determined CPE statically.

In a further implementation form of the first aspect, the management plane is configured to assign each I/O channel to a determined CPE dynamically.

In a further implementation form of the first aspect, the device comprising a context database storing the verification information, wherein the verification information is included in one or more of: an identity manager, a policy manager, or a behavioral database.

In a further implementation form of the first aspect, the policy manager is configured to store verification information comprising at least one of: a translation information of the memory, an association information of at least one I/O channel to a CPE, or a transactor identity of at least one I/O channel.

In a further implementation form of the first aspect, the device is further configured to extract, by the identity manager, a transactor identity from the received transaction, and extract, by the policy manager, a channel enclave policy from the received transaction.

In a further implementation form of the first aspect, the device is further configured to determine the correlation based on the extracted transactor identity and the extracted channel enclave policy, and allow execution of the transaction, when the determined correlation meets the predefined criterion, or abort the transaction, when the determined correlation does not meet the predefined criterion.

In a further implementation form of the first aspect, the device is further configured to store, in the behavioral database, each aborted transaction, and update the behavioral database in the context database.

In a further implementation form of the first aspect, the device is further configured to determine, whether an aborted transaction that is stored in the behavioral database, is a malicious transaction, and perform a protection exception procedure, when it is determined that the aborted transaction is a malicious transaction.

In a further implementation form of the first aspect, the protection exception procedure comprises generating an interrupt notification to a control function, the interrupt notification indicating information that the aborted transaction is violating a channel enclave policy.

In a further implementation form of the first aspect, each CPE is associated with an I/O channel implemented as a transmit (Tx) and a receive (Rx) ring queue flow.

In a further implementation form of the first aspect, the received transaction comprises a Tx or an Rx descriptor, comprising the one or more target addresses, and the device is configured to determine the correlation by verifying a memory boundary, based on the Tx or the Rx descriptor and the verification information of the CPE associated with the one or more target addresses, and process or abort, the Tx or the Rx descriptor of the ring queue flow, based on the verifying result.

In a further implementation form of the first aspect, each CPE is associated with an I/O channel comprising a non-volatile memory express flow.

A second aspect of the disclosure provides a method for supporting I/O channel protection, the method comprising maintaining one or more CPEs, wherein each CPE is associated with a different I/O channel, wherein each I/O channel is associated with a different address space of a memory, and wherein each CPE is allocated verification information comprising the address space associated with its associated I/O channel, receiving a transaction on a given I/O channel, the transaction comprising access information including one or more target addresses, determining a correlation of the transaction's access information and the verification information of the CPE associated with the given I/O channel, and allowing execution of the transaction, when the determined correlation meets a predefined criterion.

In an implementation form of the second aspect, the method further comprises aborting, when the determined correlation does not meet the predefined criterion, the transaction, and outputting a notification message, the notification message indicating that the transaction is aborted.

In a further implementation form of the second aspect, the method further comprises assigning, by a management plane, each I/O channel to a determined CPE, wherein a total number of the assigned I/O channels is equal to or smaller than a total number of the CPEs.

In a further implementation form of the second aspect, the method further comprises assigning, by the management plane, each I/O channel to a determined CPE statically.

In a further implementation form of the second aspect, the method further comprises assigning, by the management plane, each I/O channel to a determined CPE dynamically.

In a further implementation form of the second aspect, the method further comprises storing, by a context database, the verification information, wherein the verification information is included in one or more of: an identity manager, a policy manager, or a behavioral database.

In a further implementation form of the second aspect, the method further comprises storing, by the policy manager, verification information comprising at least one of: a translation information of the memory, an association information of at least one I/O channel to a CPE, or a transactor identity of at least one I/O channel.

In a further implementation form of the second aspect, the method further comprises extracting, by the identity manager, a transactor identity from the received transaction, and extracting, by the policy manager, a channel enclave policy from the received transaction.

In a further implementation form of the second aspect, the method further comprises determining the correlation based on the extracted transactor identity and the extracted channel enclave policy, and allowing execution of the transaction, when the determined correlation meets the predefined criterion, or aborting the transaction, when the determined correlation does not meet the predefined criterion.

In a further implementation form of the second aspect, the method further comprises storing, in the behavioral database, each aborted transaction, and updating the behavioral database in the context database.

In a further implementation form of the second aspect, the method further comprises determining, whether an aborted transaction that is stored in the behavioral database, is a malicious transaction, and performing a protection exception procedure, when it is determined that the aborted transaction is a malicious transaction.

In a further implementation form of the second aspect, the method further comprises generating an interrupt notification to a control function, the interrupt notification indicating information that the aborted transaction is violating a channel enclave policy.

In a further implementation form of the second aspect, the method further comprises associating each CPE with an I/O channel implemented as a Tx and a receive Rx ring queue flow.

In a further implementation form of the second aspect, the received transaction comprises a Tx or an Rx descriptor, comprising the one or more target addresses, and the method further comprises determining the correlation by verifying a memory boundary, based on the Tx or the Rx descriptor and the verification information of the CPE associated with the one or more target addresses, and processing or abort, the Tx or the Rx descriptor of the ring queue flow, based on the verifying result.

In a further implementation form of the second aspect, the method further comprises associating each CPE with an I/O channel comprising a non-volatile memory express flow.

The method of the second aspect achieves the advantages and effects described for the device of the first aspect.

A third aspect of the present disclosure provides a computer program comprising a program code for performing the method according to the second aspect or any of its implementation forms.

A fourth aspect of the present disclosure provides a non-transitory storage medium storing executable program code which, when executed by a processor, causes the method according to the second aspect or any of its implementation forms to be performed.

It has to be noted that all devices, elements, units and means described in the present application could be implemented in the software or hardware elements or any kind of combination thereof. All steps which are performed by the various entities described in the present application as well as the functionalities described to be performed by the various entities are intended to mean that the respective entity is adapted to or configured to perform the respective steps and functionalities. Even if, in the following description of specific embodiments, a specific functionality or step to be performed by external entities is not reflected in the description of a specific detailed element of that entity which performs that specific step or functionality, it should be clear for a skilled person that these methods and functionalities can be implemented in respective software or hardware elements, or any kind of combination thereof.

BRIEF DESCRIPTION OF DRAWINGS

The above described aspects and implementation forms will be explained in the following description of specific embodiments in relation to the enclosed drawings, in which.

DETAILED DESCRIPTION OF EMBODIMENTS

Figure 1:
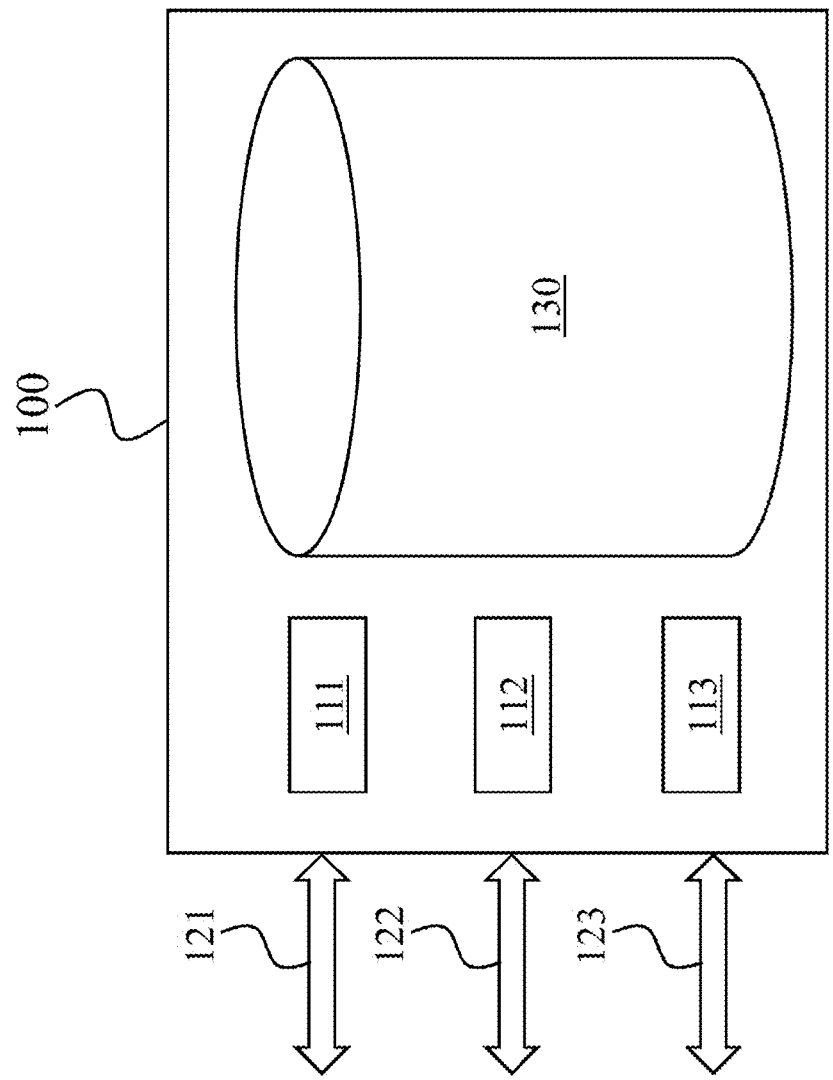
FIG. 1 depicts a schematic view of a device for supporting I/O channel protection, according to an embodiment of the disclosure.

FIG. 1 shows a device for supporting I/O channel protection, according to an embodiment of the disclosure.

The device 100 is configured to maintain one or more CPEs 111, 112, 113, wherein each CPE 111, 112, 113 is associated with a different I/O channel 121, 122, 123, and wherein each I/O channel 121, 122, 123 is associated with a different address space of a memory 130. Further, each CPE 111, 112, 113 is allocated verification information comprising the address space associated with its associated I/O channel 121, 122, 123.

For example, the device 100 may comprise an entity (e.g., a SW) which may create the CPEs 111, 112, 113. The CPEs 111, 112, 113 may be created based on the memory 130, for example, one or more process memory spaces, or different spaces of the memory 130 associated with different processes, a memory function, a memory region, a memory window, etc.

Moreover, the device 100 may allocate verification information to the one or more CPEs 111, 112, 113 (e.g., the device 100 may fill each CPE with verification information). The verification information may be, for example, information related to the address space of the memory, a memory resource, an identity manager, a policy manager, etc.

The device 100 is further configured to receive a transaction on a given I/O channel 121, 122, 123, the transaction comprising access information including one or more target addresses.

For example, the transactions may be a queue, a process, a container, etc. Moreover, each transaction may comprise access information, for example, an identity information, address information, etc. Each transaction may be received on a given I/O channel 121, 122, 123, and the access information of each transaction may be used for determining the correlation between its access information and the verification information of the CPEs 111, 112, 113, in order to perform a memory access.

The device 100 is further configured to determine a correlation of the transaction's access information and the verification information of the CPE 111, 112, 113 associated with the given I/O channel 121, 122, 123.

The device 100 is further configured to allow execution of the transaction, when the determined correlation meets a predefined criterion.

The correlation may be based on a matching process, and the predefined criterion may be the access information of the transaction that is received on a given I/O channel 121, 122, 123 matches the verification information of the CPE 111, 112, 113 that is associated with that given channel.

Moreover, the device 100 may provide a memory isolation, a memory protection. For example, when the device 100 determines that there is a correlation (e.g., the match is found) between the access information of the transaction and the verification information of the CPE 111, 112, 113, the transaction may be executed and the memory may be accessed.

The device 100 may comprise a processing circuitry (not shown in FIG. 1) configured to perform, conduct or initiate the various operations of the device 100 described herein.

The processing circuitry may comprise hardware and software. The hardware may comprise analog circuitry or digital circuitry, or both analog and digital circuitry. The digital circuitry may comprise components such as application-specific integrated circuits (ASICs), field-programmable arrays (FPGAs), digital signal processors (DSPs), or multipurpose processors. In one embodiment, the processing circuitry comprises one or more processors and a non-transitory memory connected to the one or more processors. The non-transitory memory may carry executable program code which, when executed by the one or more processors, causes the device 100 to perform, conduct or initiate the operations or methods described herein.

Figure 2:
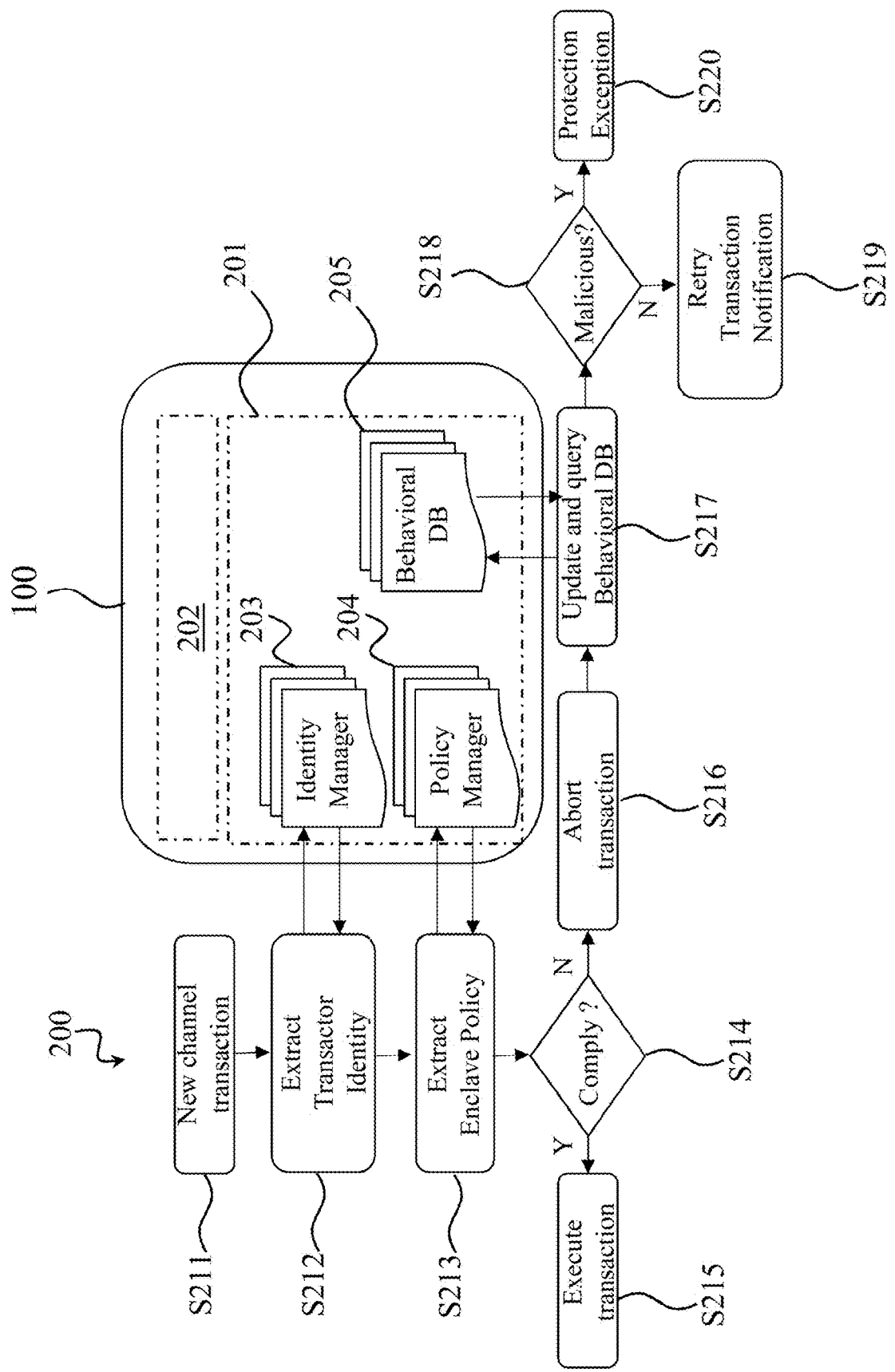
FIG. 2 depicts a schematic view of a procedure for providing memory isolation and protection based on identity management.

FIG. 2 depicts a schematic view of a procedure 200 for providing memory isolation and protection based on identity management.

The procedure 200 may be performed by the device 100, as it is described above. For example, the device 100 may comprise a CPE context database 201 including an identity manager 203, a policy manager 204, and a behavioral database 205. The device 100 further comprises a CPE management plane 202. For example, the device 100 may be based on an I/O device, and the CPE context database 201 and the CPE management plane 202 may be registered to the memory resource allocation layer in the associated operating system.

The CPE management plane 202 of the device 100 is configured to allow dynamically assigning the entries to any function, where the total number does not exceed the number of the queues. For example, a maximum number of entries may be assigned to one function.

The CPE context database 201 of the device 100 may be configured to verify that the address space is within the specific transactor identity (e.g., in a PCIe I/O device, the PCIe function, etc.) address space. The verification may be performed based on the system configuration and in order to prevent access violations.

At step S211, the device 100 receives a new channel transaction, i.e., a transaction on any of the I/O channels 121, 122, 123.

At step S212, the device 100 extracts a transactor identity. For example, the device 100 may comprise the identity manager 201. Moreover, the identity manager 201 may extract a transactor identity from the received transaction.

At step S213, the device 100 may extract an enclave policy. For example, the device 100 may comprise the CPE policy manager 204. The CPE policy manager 204 may be configured to store, for example, detailed memory translation and ownership association for each channel 121, 122, 123 and corresponding transactor identities of each channel, for implementing the isolation mechanism. In a PCIe I/O device, the stored information may include, e.g., the PCIe function and process identity along with the memory translation information associated with the I/O Channel 121, 122, 123 (e.g., a queue). Examples of the queues are a ring queue format, a direct queue, an indirect queue, etc. The PCIe function may be either a physical function or a virtual function of a PCIe device, and may have an identity according to ARI or non ARI mode.

The device 100 may enforce through the CPE policy manager 204 various policy restrictions, e.g., the maximal amount of queues per process or function. Moreover, whenever the I/O device is attempting to perform a memory access or a DMA to an I/O channel, and the target addresses for that access (whether it being a read or a write access), originated from an untrusted or protected entity, the device may correlate the information in the CPE policy manager with said access information.

At step S214, the device 100 determines a correlation of the transaction's access information and the verification information. Moreover, when it determines "Yes", i.e., it complies and the correlation meets the predefined criterion, the device 100 goes to step S215. However, when it determines "NO", i.e., the correlation does not meet the predefined criterion, the device 100 goes to step S216.

At step S215, the device 100 allows execution of the transaction, i.e., the determined correlation meets the predefined criterion. For example, when there is a correlation between the access attempt and the information in the CPE, the access may be executed normally.

At step S216, the device 100 aborts the transaction, i.e., the determined correlation does not meet the predefined criterion. For example, when there is no correlation between the access attempt and the information in the CPE policy manager 204 (e.g., the memory being accessed is not associated with the applicable queue), the transaction might not be executed, and consequently, at step S217, the transaction may be transferred for further behavioral DB query.

At step S217, the device 100 stores the aborted transaction in the behavioral database 205 and updates the behavioral database 205 in the context database 201.

At step S218, the device 100 determines whether the aborted transaction that is stored in the behavioral database 205, is a malicious transaction or not. Moreover, when it is determined "Yes", the device 100 goes to step S220, and when it is determined "No", the device 100 goes to step S219.

At step S219, the device 100 retries the transaction notification.

At step S220, the device 100 performs a protection exception procedure, i.e., it is determined that the aborted transaction is a malicious transaction. The protection exception may include generating an interrupt or other indication to a supervising or control function with applicable information on the access violating the CPE programmed information.

Figure 3:
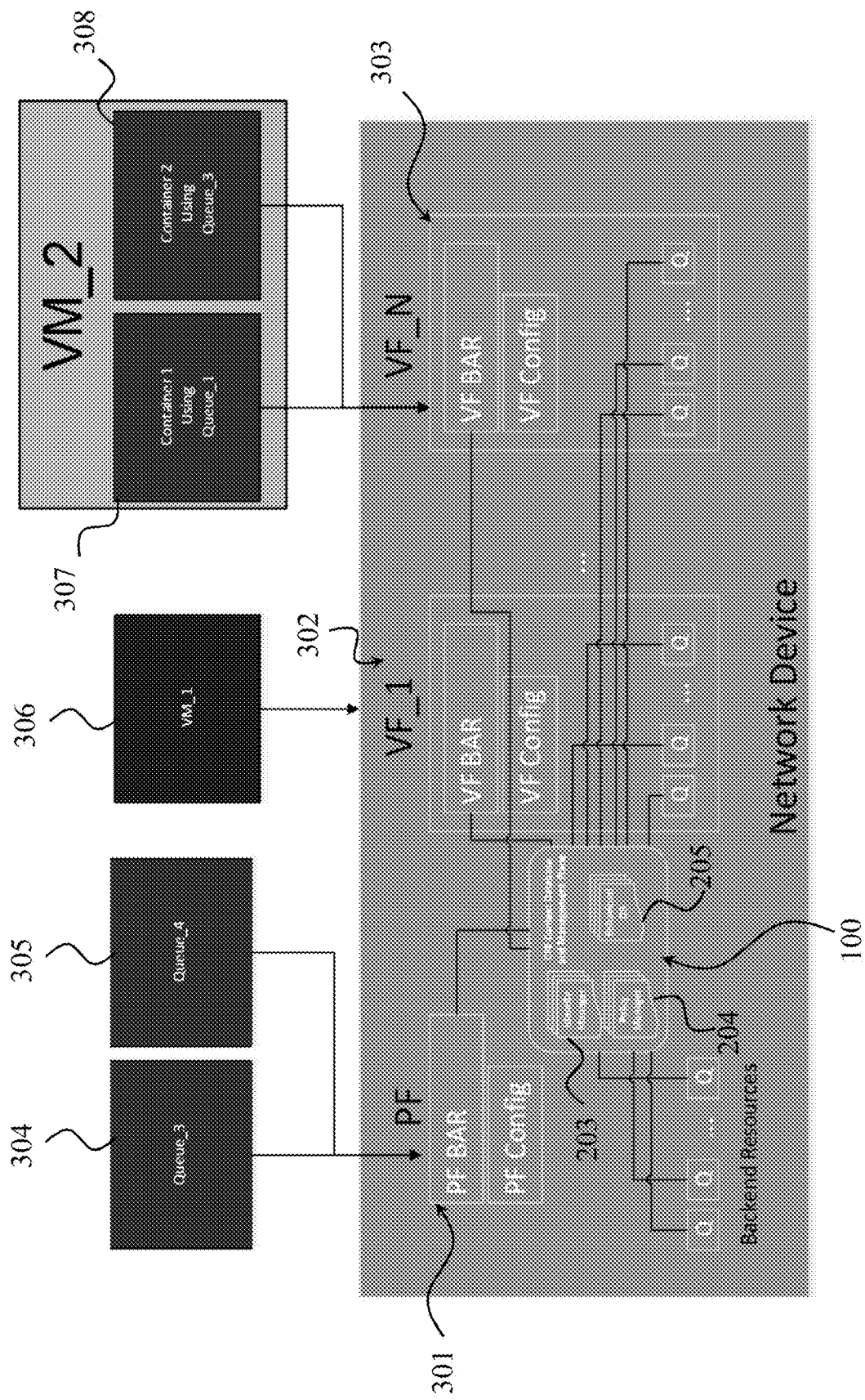
FIG. 3 depicts a schematic view illustrating the device allowing a physical function or a plurality of virtual functions to isolate memories assigned to different queues.

FIG. 3 depicts a schematic view of the device 100 allowing a physical function (PF) 301 or a plurality of virtual functions (VFs) 302, 303 to isolate memories assigned to different queues 304, 305, 306, 307, 308.

The device 100 of FIG. 3 is exemplary implemented in a network device comprising a PF 301, and a plurality of VFs 302, 303.

The device 100 may support I/O channel protection based on providing the CPE mechanism that may allow the PF 301 or the plurality of VFs 302, 303 to isolate memories assigned to different queues 304, 305, 306, 307, 308 (or process or containers).

The device 100 may enable entities including PF 301 or the plurality of VFs 302, 303 running on common servers (e.g., the network device in FIG. 3), with no Single I/O Virtualization (S-IOV) support (or when the S-IOV is not activated), to deliver isolation on a queue level.

For example, the device 100 of FIG. 3 may allow the PF 301 or the VFs 302, 303 to run many processes or containers, and may further isolate those using different queues 304, 305, 306, 307, 308.

Figure 4:
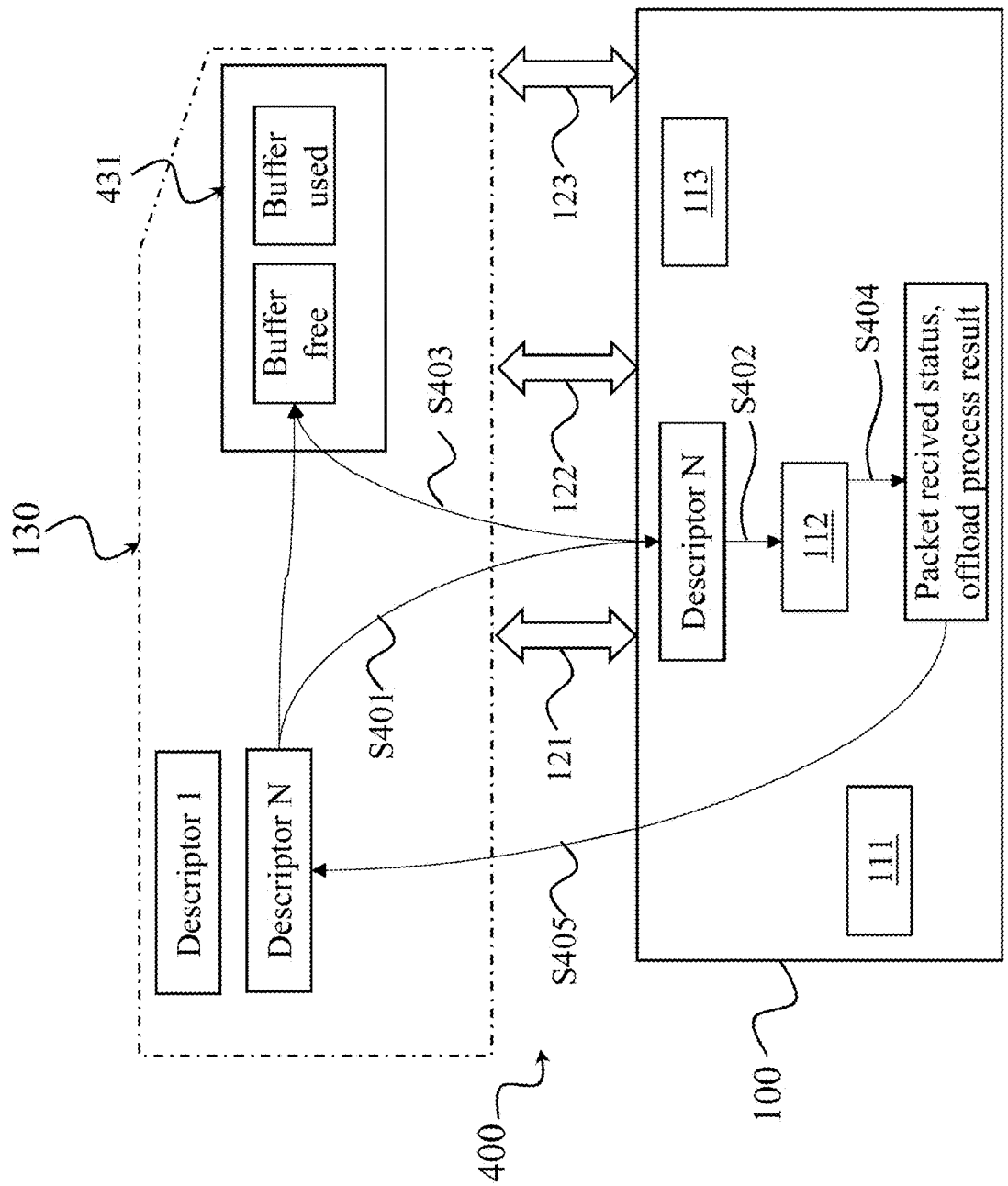
FIG. 4 depicts a schematic view illustrating an exemplary CPE associated with an I/O channel implemented as a Tx and an Rx ring queue flow.

Reference is made to FIG. 4 which is a schematic view of an exemplary CPE 111, 112, 113 associated with an I/O channel 121, 122, 123 implemented as a Tx and an Rx ring queue flow.

An example of the Tx path procedure 400 (for example, the device 100 may fully or partially perform the procedure 400) is as follows:

At step S401, the device 100 (e.g., a HW) fetches a Tx descriptor from a memory 130 (e.g., it's a Random Access Memory (RAM)) comprising descriptor 1 to descriptor N, and a packet buffer pool 431 including buffer-used and buffer-free. The descriptor may be fetched from a descriptor queue that contains a few Tx descriptors (descriptors 1 to descriptor N).

At step S402, the device 100 (e.g., the HW) checks the address that the descriptor points to a buffer in the buffer pool 431. For example, the device 100 may create and may further maintain the CPEs 111, 112, 113. Moreover, the device 100 (e.g., the CPEs 111, 112, 113) may verify that the memory pointed by the descriptor is within the queue or the process or the container boundaries, for example, by correlating the verification information of the CPE 111, 112, 113 and the address pointed by the descriptor.

At step S403, if the memory address has no translation (e.g., the memory is outside the allowed boundaries), the device 100 drops the Tx descriptor (i.e., the packet) and generates an interrupt to the PF and/or the VF. The interrupt handler may read the relevant descriptor information that may be required for preventing memory leaks.

At step S404, depending on configuration, the device 100 may or may not continue processing the Tx descriptors for the said queue (the queue comprising descriptors 1 to descriptor N).

At step S405, if a CPE translation exists (i.e., the address is within the allowed memory boundaries), the device 100 (the HW) may process the Tx packet and may obtain the received packet process result, offload the process result, and may further write back to the memory 130, etc.

As follows, the procedure 400 is discussed based on an Rx path procedure.

An example of the Rx path procedure 400 (for example, the device 100 may fully or partially perform the procedure 400) is as follows:

At step S401, the device 100 (e.g., a HW) fetches an Rx descriptor from a memory 130 (e.g., it's a RAM) comprising descriptor 1 to descriptor N, and a packet buffer pool 431 including buffer-used and buffer-free. The descriptor may be fetched from a descriptor queue that contains a few Rx descriptors (descriptors 1 to descriptor N).

At step S402, the device 100 (the HW) checks the address that the descriptor points to a buffer in the buffer pool 431. For example, the device 100 may create and may further maintain the CPEs 111, 112, 113. Moreover, the device 100 (e.g., the CPEs 111, 112, 113) may verifies that the memory pointed by the descriptor 401 is within the queue or the process or the container boundaries, for example, by correlating the verification information of the CPE 111, 112, 113 and the address pointed by the descriptor.

At step S403, if the memory address has no translation (e.g., the memory is outside the allowed boundaries or the access right allowed is read only), the device 100 drops the Rx descriptor (the packet) and generates an interrupt to the PF and/or the VF. The interrupt handler may read the relevant descriptor information that may be required for preventing memory leaks.

At step S404, depending on configuration, the device 100 may or may not continue processing descriptors for the said queue (the queue comprising descriptors 1 to descriptor N).

At step S405, if there is a CPE translation (it's within the allowed memory boundaries), the device 100 (the HW) may process the Rx descriptor (the packet) offload the process result, and may further write back to the memory 130, etc.

Figure 5:
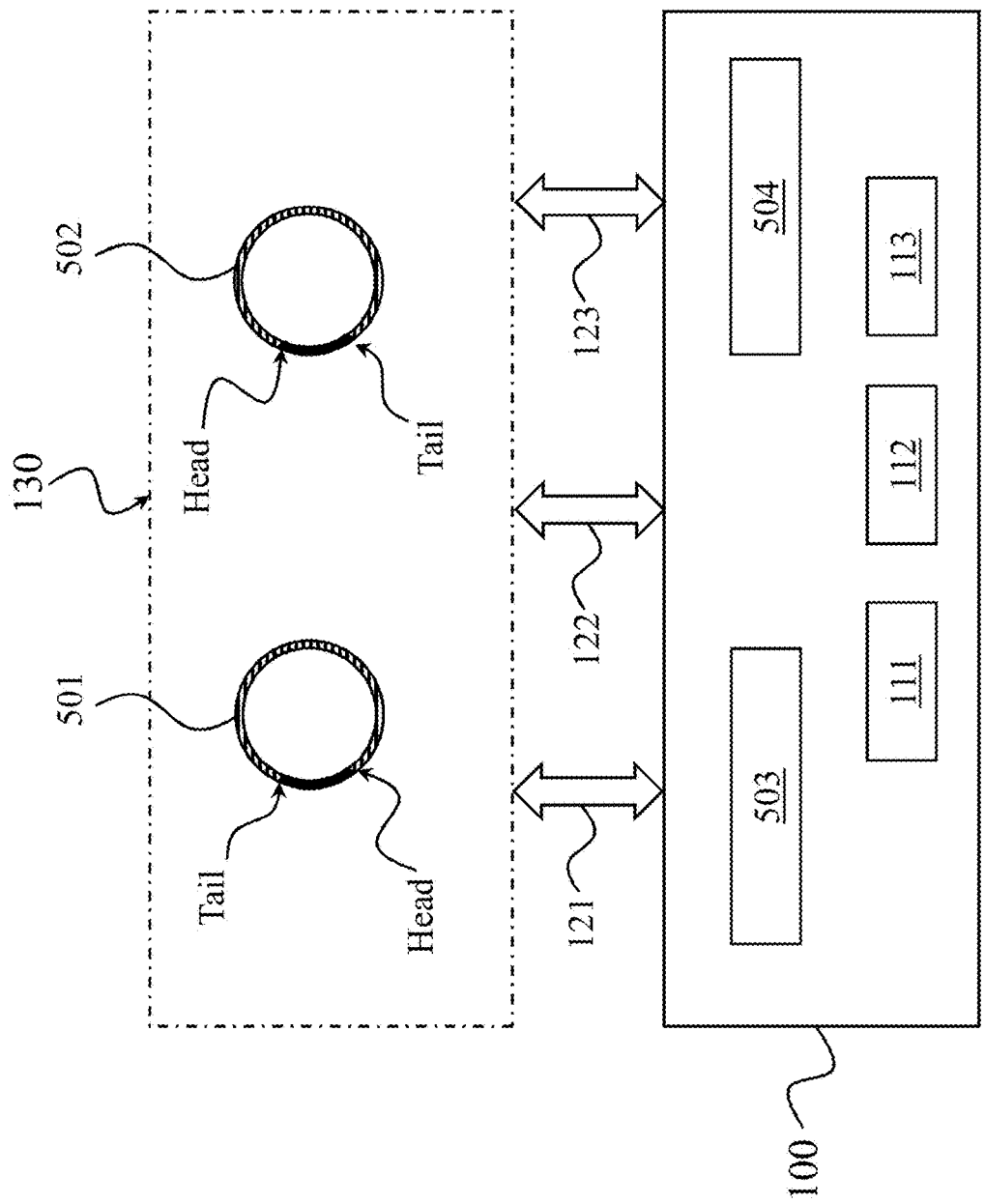
FIG. 5 depicts a schematic view illustrating exemplary CPE that is associated with an I/O channel comprising a non-volatile memory express flow.

Reference is made to FIG. 5 which is a schematic view of an exemplary CPE 111, 112, 113 that is associated with an I/O channel 121, 122, 123 comprising a non-volatile memory express flow.

The device 100 may enable the isolation to the block devices by implementing the same over the NVMe interfaces such as queues.

An example of the use of CPE in NVMe flows is illustrated in FIG. 5. For example, the memory 130 (e.g., a host memory) comprising a submission queue 501 and a completion queue 502. The memory 130 (host memory) stores a command in a queue, and a ring doorbell is used to notify the device 100 (for example, the device 100 is exemplary implemented as an NVMe controller). The device 100 (the NVMe controller) may fetch the command, and may further verify the command memory boundaries on the memory 130 (host memory) and on the destination NVMe device 100, for example, the device 100 may create and may further maintain the CPEs 111, 112, 113. Moreover, the device 100 (e.g., the CPEs 111, 112, 113) may verify the memory boundaries, and the verification may be based on the correlation of the transaction's (e.g., the command's) access information and the verification information associated with the CPEs 111, 112, 113. If this correlation meets the predefined criterion and passes successfully, then the device 100 (e.g., the controller) processes the command (i.e., the device 100 allows execution of the transaction), otherwise, the device 100 may drop the command, output a notification message (e.g., comprising an error) and may further generate an interrupt to the PF and/or the VF.

The device 100 (e.g., the NVMe controller) may comprise a submission queue tail doorbell 503 and a completion queue head doorbell 504. Moreover, the interface from the device 100 (e.g., the NVMe controller) to the memory 130 (e.g., the host memory) may include a completion queue, and an interrupt or the doorbell may be used by the controller to notify about a new completion.

Figure 6:
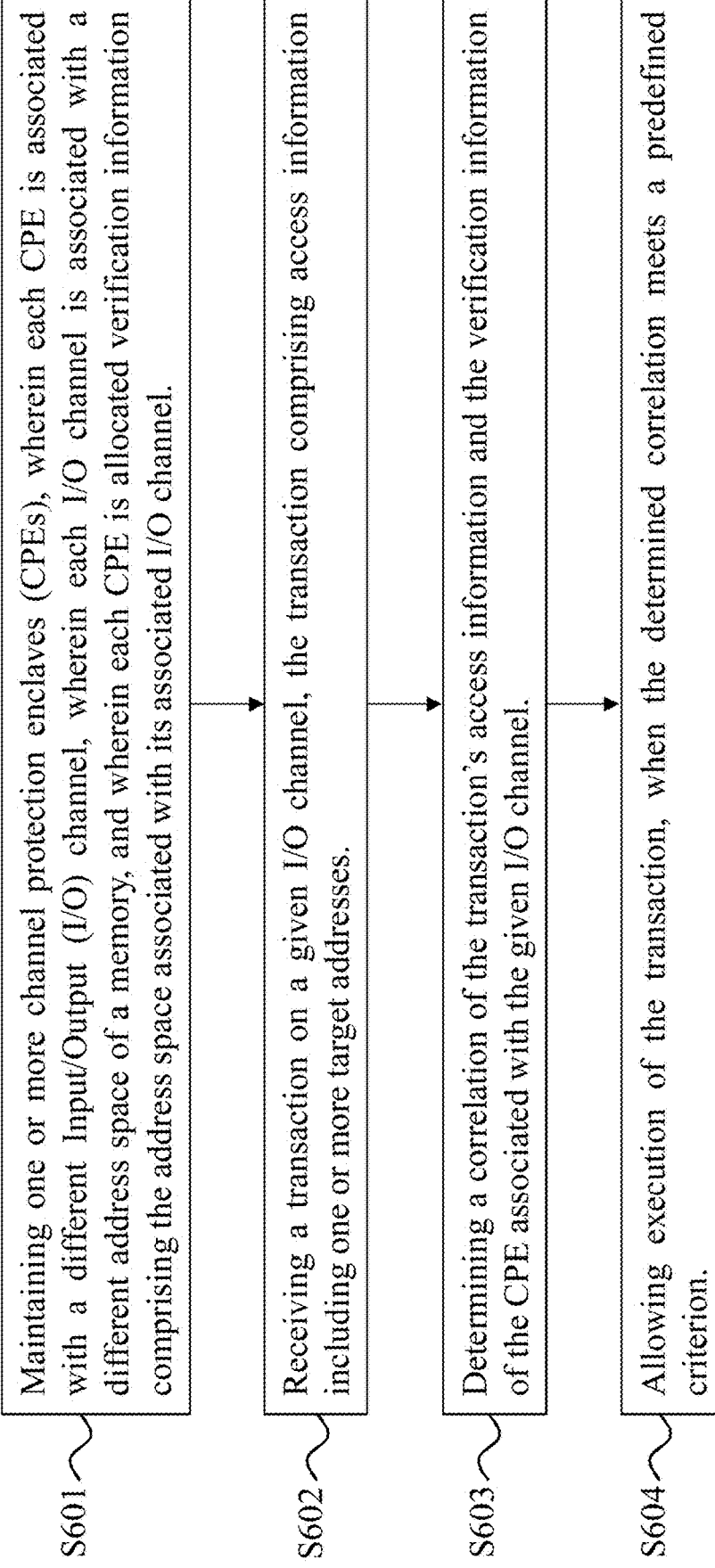
FIG. 6 depicts a flowchart of a method for supporting I/O channel protection, according to an embodiment of the disclosure.

FIG. 6 shows a method 600 according to an embodiment of the disclosure for supporting IO channel protection. The method 600 may be carried out by the device 100, as it is described above.

The method 600 comprises a step S601 of maintaining one or more CPEs 111, 112, 113, wherein each CPE 111, 112, 113 is associated with a different I/O channel 121, 122, 123, wherein each I/O channel 121, 122, 123 is associated with a different address space of a memory 130, and wherein each CPE 111, 112, 113 is allocated verification information comprising the address space associated with its associated I/O channel 121, 122, 123.

The method 600 further comprises a step S602 of receiving a transaction on a given I/O channel 121, 122, 123, the transaction comprising access information including one or more target addresses.

The method 600 further comprises a step S603 of determining a correlation of the transaction's access information and the verification information of the CPE 111, 112, 113 associated with the given I/O channel 121, 122, 123.

The method 600 further comprises a step S604 of allowing execution of the transaction, when the determined correlation meets a predefined criterion.

The present disclosure has been described in conjunction with various embodiments as examples as well as implementations. However, other variations can be understood and effected by those persons skilled in the art and practicing the claimed disclosure, from the studies of the drawings, this disclosure and the independent claims. In the claims as well as in the description the word "comprising" does not exclude other elements or steps and the indefinite article "a" or "an" does not exclude a plurality. A single element or other unit may fulfill the functions of several entities or items recited in the claims. The mere fact that certain measures are recited in the mutual different dependent claims does not indicate that a combination of these measures cannot be used in an advantageous implementation.

What is claimed is:

1. A device for supporting Input/Output (I/O) channel protection, the device comprising:
   a memory; and
   processing circuitry configured to:
      maintain one or more channel protection enclaves (CPEs), wherein each CPE is associated with a different I/O channel implemented as a transmit (Tx) and a receive (Rx) ring queue flow, wherein each I/O channel is associated with a different address space of a memory, and wherein each CPE is allocated verification information comprising the address space associated with its associated I/O channel;
      receive a transaction on a given I/O channel, the transaction comprising access information including one or more target addresses;
      determine a correlation of the access information and the verification information of the CPE associated with the given 1/0 channel,
      wherein the device comprises a context database storing the verification information, wherein the verification information is included in one or more of:
      an identity manager,
      a policy manager, or
      a behavioral database, and
      wherein the device is further configured to:
         extract, by the identity manager, a transactor identity from the received transaction,
         extract, by the policy manager, a channel enclave policy from the received transaction, and
         determine the correlation based on the extracted transactor identity and the extracted channel enclave policy; and
      responsive to determining that the correlation meets a predefined criterion, allow execution of the transaction, or
      responsive to determining that the correlation does not meet the predefined criterion, abort the transaction,
      wherein the transaction comprises a Tx descriptor or an Rx descriptor, the Tx descriptor or the Rx descriptor comprising the one or more target addresses; and
      wherein the device is further configured to:
         determine the correlation by verifying a memory boundary based on the Tx descriptor or the Rx descriptor and the verification information of the CPE associated with the one or more target addresses; and
         process or abort the Tx descriptor or the Rx descriptor of the ring queue flow based on a result of the verifying.

2. The device according to claim 1, the device further configured to:
responsive to aborting the transaction, output a notification message indicating that the transaction is aborted.

3. The device according to claim 1, the device comprising a management plane configured to:
assign each I/O channel to a determined CPE, wherein a total number of the assigned I/O channels is equal to or smaller than a total number of the CPEs.

4. The device according to claim 3, wherein the management plane is further configured to:
assign each I/O channel to the determined CPE statically.

5. The device according to claim 3, wherein the management plane is further configured to:
assign each I/O channel to the determined CPE dynamically.

6. The device according to claim 3, wherein:
the policy manager is configured to store verification information comprising at least one of: a translation information of the memory, an association information of at least one I/O channel to a CPE, or a transactor identity of at least one I/O channel.

7. The device according to claim 3, the device further configured to:
store, in the behavioral database, each aborted transaction; and
update the behavioral database in the context database.

8. The device according to claim 7, the device further configured to:
determine whether an aborted transaction that is stored in the behavioral database is a malicious transaction; and
responsive to determining that the aborted transaction is a malicious transaction, perform a protection exception procedure.

9. The device according to claim 8, wherein:
the protection exception procedure comprises generating an interrupt notification to a control function, the interrupt notification indicating information that the aborted transaction is violating the channel enclave policy.

10. The device according to claim 1, wherein:
each CPE is associated with an I/O channel comprising a non-volatile memory express flow.

11. A method for supporting Input/Output (I/O) channel protection, the device comprising:
maintaining one or more channel protection enclaves (CPEs), wherein each CPE is associated with a different I/O channel implemented as a transmit (Tx) and a receive (Rx) ring queue flow, wherein each I/O channel is associated with a different address space of a memory, and wherein each CPE is allocated verification information comprising the address space associated with its associated I/O channel;

receive a transaction on a given I/O channel, the transaction comprising access information including one or more target addresses;

determine a correlation of the access information and the verification information of the CPE associated with the given I/O channel, wherein the device comprises a context database storing the verification information, wherein the verification information is included in one or more of:

an identity manager, a policy manager, or a behavioral database, and wherein the device is further configured to:
extract, by the identity manager, a transactor identity from the received transaction,
extract, by the policy manager, a channel enclave policy from the received transaction, and
determine the correlation based on the extracted transactor identity and the extracted channel enclave policy; and responsive to determining that the correlation meets a predefined criterion, allow execution of the transaction, or responsive to determining that the correlation does not meet the predefined criterion, abort the transaction, wherein the transaction comprises a Tx descriptor or an Rx descriptor, the Tx descriptor or the Rx descriptor comprising the one or more target addresses; and wherein the device is further configured to:
determine the correlation by verifying a memory boundary based on the Tx descriptor or the Rx descriptor and the verification information of the CPE associated with the one or more target addresses; and
process or abort the Tx descriptor or the Rx descriptor of the ring queue flow based on a result of the verifying.

12. A computer program product comprising instructions that, responsive to being executed by a computer, cause the computer to perform the method of claim 11.

* * * * *

UNITED STATES PATENT AND TRADEMARK OFFICE
CERTIFICATE OF CORRECTION

| | | Page 1 of 1 |
|---|---|---|
| PATENT NO. | : 11,977,668 B2 | |
| APPLICATION NO. | : 17/348352 | |
| DATED | : May 7, 2024 | |
| INVENTOR(S) | : Ben-Shahar Belkar | |

It is certified that error appears in the above-identified patent and that said Letters Patent is hereby corrected as shown below:

In the Claims

Claim 1, Column 12, Line 36: reads as "with the given 1/O channel." should read as --with the given I/O channel.--

Signed and Sealed this
Twenty-second Day of April, 2025

Coke Morgan Stewart
*Acting Director of the United States Patent and Trademark Office*